US008561201B2

(12) United States Patent
Kanai

(10) Patent No.: US 8,561,201 B2
(45) Date of Patent: Oct. 15, 2013

(54) IMAGE READING APPARATUS, AN IMAGE INFORMATION VERIFICATION APPARATUS, AN IMAGE READING METHOD, AN IMAGE INFORMATION VERIFICATION METHOD, AND AN IMAGE READING PROGRAM

(75) Inventor: Yoichi Kanai, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1409 days.

(21) Appl. No.: 11/836,183

(22) Filed: Aug. 9, 2007

(65) Prior Publication Data
US 2008/0040813 A1    Feb. 14, 2008

(30) Foreign Application Priority Data

Aug. 9, 2006    (JP) .................................. 2006-217285

(51) Int. Cl.
*G06F 7/04*    (2006.01)

(52) U.S. Cl.
USPC ................... 726/26; 726/27; 726/30; 726/21; 713/176; 713/169; 713/153; 257/761; 705/42

(58) Field of Classification Search
USPC ....................................... 726/26–27; 382/100
See application file for complete search history.

(56) References Cited

U.S. PATENT DOCUMENTS

| | | | |
|---|---|---|---|
| 4,218,674 A | 8/1980 | Brosow et al. | |
| 6,668,096 B1 | 12/2003 | Yamamoto | |
| 7,007,303 B2 * | 2/2006 | Goldberg et al. | 726/26 |
| 7,072,062 B2 * | 7/2006 | Eguchi | 358/1.15 |
| 7,162,637 B2 * | 1/2007 | Wakao et al. | 713/176 |
| 7,302,578 B2 * | 11/2007 | Kobayashi | 713/182 |
| 7,320,138 B2 * | 1/2008 | Wakao et al. | 726/2 |
| 7,610,489 B2 * | 10/2009 | Maruyama et al. | 713/182 |
| 7,716,490 B2 * | 5/2010 | Kanai | 713/182 |
| 7,773,749 B1 * | 8/2010 | Durst et al. | 380/54 |
| 7,828,215 B2 * | 11/2010 | Chung et al. | 235/454 |
| 8,037,307 B2 * | 10/2011 | Irwin, Jr. | 713/173 |
| 8,110,008 B2 * | 2/2012 | Perori et al. | 726/35 |

(Continued)

FOREIGN PATENT DOCUMENTS

| | | |
|---|---|---|
| EP | 0 853 294 | 7/1998 |
| EP | 1 326 207 | 7/2003 |

(Continued)

OTHER PUBLICATIONS

Tirkel AZ, A unique watermark for every image, IEEE, vol. 8, Issue 4, pp. 1-8.*

(Continued)

*Primary Examiner* — Nathan Flynn
*Assistant Examiner* — Viral Lakhia
(74) *Attorney, Agent, or Firm* — Harness, Dickey & Pierce, P.L.C.

(57) ABSTRACT

An image reading apparatus, an image information verification apparatus, an image reading method, an image information verification method, and an image reading program are disclosed. The image reading apparatus includes an image acquisition unit for acquiring an image from an image reading unit for reading the image formed on a medium, a medium description receiving unit for receiving a medium description provided by a medium description acquisition unit for acquiring the medium description of the medium, a set generating unit for generating a set of information about the image and information about the medium description, and a set unique value acquisition unit for acquiring a set unique value about the set.

15 Claims, 12 Drawing Sheets

(56) References Cited

U.S. PATENT DOCUMENTS

| | | | |
|---|---|---|---|
| 8,171,567 B1* | 5/2012 | Fraser et al. | 726/32 |
| 2002/0061120 A1 | 5/2002 | Carr et al. | |
| 2002/0194209 A1* | 12/2002 | Bolosky et al. | 707/205 |
| 2003/0105739 A1* | 6/2003 | Essafi et al. | 707/1 |
| 2003/0204812 A1 | 10/2003 | Hayashi | |
| 2003/0223584 A1 | 12/2003 | Bradley et al. | |
| 2004/0021890 A1* | 2/2004 | Hirai et al. | 358/1.13 |
| 2004/0094723 A1* | 5/2004 | Walker | 250/461.1 |
| 2004/0258276 A1 | 12/2004 | Ishii et al. | |
| 2004/0264734 A1 | 12/2004 | Wakao | |
| 2005/0036651 A1* | 2/2005 | Wen | 382/100 |
| 2005/0134896 A1* | 6/2005 | Koga | 358/1.14 |
| 2005/0257064 A1* | 11/2005 | Boutant et al. | 713/180 |
| 2005/0289182 A1* | 12/2005 | Pandian et al. | 707/104.1 |
| 2006/0010500 A1* | 1/2006 | Elazar et al. | 726/27 |
| 2006/0153380 A1* | 7/2006 | Gertner | 380/221 |
| 2006/0161977 A1* | 7/2006 | Jung et al. | 726/21 |
| 2006/0168657 A1* | 7/2006 | Baentsch et al. | 726/21 |
| 2006/0180515 A1 | 8/2006 | Kimura et al. | |
| 2006/0200661 A1* | 9/2006 | Doonan et al. | 713/156 |
| 2006/0230286 A1* | 10/2006 | Kitada | 713/186 |
| 2007/0192850 A1* | 8/2007 | Cowburn | 726/20 |
| 2008/0021857 A1* | 1/2008 | Makishima et al. | 707/1 |

FOREIGN PATENT DOCUMENTS

| | | |
|---|---|---|
| JP | 2000-215379 | 8/2000 |
| JP | 2002-230202 | 8/2002 |
| JP | 2004-102562 | 4/2004 |
| JP | 2005-038389 | 2/2005 |
| JP | 2005192148 | 7/2005 |
| JP | 2006-107225 | 4/2006 |

OTHER PUBLICATIONS

European Search Report for corresponding application.
James D. R. Buchanan et al., "'Fingerprinting' documents and packaging", Nature, Jul. 28, 2005, vol. 436, p. 475, Nature Publishing Group.
Partial European Search Report.
Notice of Rejection of Japanese Patent Application JP 2006-217285 dated Mar. 29, 2011, issued by the Japanese Patent Office.

* cited by examiner

IMAGE READING APPARATUS, AN IMAGE INFORMATION VERIFICATION APPARATUS, AN IMAGE READING METHOD, AN IMAGE INFORMATION VERIFICATION METHOD, AND AN IMAGE READING PROGRAM

BACKGROUND OF THE INVENTION

1. Field of the Invention

The present invention relates to an image reading apparatus, an image information verification apparatus, an image reading method, an image information verification method, and an image reading program.

2. Description of the Related Art

BACKGROUND TECHNIQUE

An image in the form of digital data (digital image data) read from a medium, such as paper, is more susceptible to tampering, such as unauthorized copying and alteration, than the image formed on the medium. Then, techniques for protecting the digital image data from tampering, and for detecting whether tampering has occurred are disclosed.

For example, Patent Reference 1 discloses a paper identification/collation apparatus for identifying paper by observing and memorizing a random pattern of vegetable fiber that twines to form the paper.

Further, Non Patent Reference 1 discloses a technique of identifying paper by observing the pattern of the vegetable fiber that twines to form the paper by a laser light.

Further, Patent Reference 2 discloses a method of certifying that an image is acquired by scanning paper by adding an electronic signature when digital image data are acquired from the image on the paper.

[Patent Reference 1] JPA 2004-102562
[Patent Reference 2] JPA 2002-230202
[Patent Reference 3] JPA 2005-38389
[Non Patent Reference 1] James D. R. Buchanan et al., "'Fingerprinting' documents and packaging", Nature, Vol. 436, pp. 475, 28 Jul. 2005

DISCLOSURE OF INVENTION

Objective of Invention

However, Patent Reference 1 and Non Patent Reference 1 do not provide a method of associating the paper that is identified with the image formed on the paper, that is, even if the paper is identified, if the image formed on the paper is tampered with, tampering cannot be detected.

Further, according to the method disclosed by Patent Reference 2, although an electronic signature is added to digital image data acquired by scanning an image on a first medium, when the image based on the digital image data is formed on a second medium, the image on the second medium cannot be differentiated from the image on the first medium. For this reason, it is difficult to prevent unauthorized copying of the image.

SUMMARY OF THE INVENTION

In view of the problems described above, the present invention provides an image reading apparatus, an image information verification apparatus, an image reading method, an image information verification method, and an image reading program that solve the problems by associating an image formed on a medium with a description of the medium.

The present invention provides an image reading apparatus, an image information verification apparatus, an image reading method, an image information verification method, and an image reading program that substantially obviate one or more of the problems caused by the limitations and disadvantages of the related art.

Features of embodiments of the present invention are set forth in the description that follows, and in part will become apparent from the description and the accompanying drawings, or may be learned by practice of the invention according to the teachings provided in the description. Problem solutions provided by an embodiment of the present invention may be realized and attained by an image reading apparatus, an image information verification apparatus, an image reading method, an image information verification method, and an image reading program particularly pointed out in the specification in such full, clear, concise, and exact terms as to enable a person having ordinary skill in the art to practice the invention.

To achieve these solutions and in accordance with an aspect of the invention, as embodied and broadly described herein, an embodiment of the invention provides an image formation apparatus and an image information verification apparatus as follows.

Means for Solving a Problem

The image formation apparatus includes an image reading unit for reading an image on a medium, an image acquiring unit for acquiring the image ready by the image reading unit, a medium description receiving unit for receiving a medium description of the medium,
a set generating unit for generating a set (a combination) of information about the image and information about the medium description, and
a set unique value acquiring unit for acquiring a unique value of the set (a set unique value).

The image reading apparatus configured as above associates an image formed on a medium with a description of the medium.

According to another aspect of the embodiment, the image reading apparatus includes a compound image information generation unit for generating compound image information wherein an image information table that contains the set unique value, information about the medium description, and information about the image is associated with the image.

The image reading apparatus as configured above generates the compound image information, wherein the image information table contains the information about the medium description associated with the image.

According to another aspect of the embodiment, the image reading apparatus includes an image unique value acquisition unit for acquiring a unique value of the image, and the set generating unit generates a set by associating the image unique value with the information about the medium description. With this configuration, the image reading apparatus that generates the compound image information containing the set of the image unique value associated with the information about the medium description is provided.

According to another aspect of the embodiment, the image reading apparatus includes a medium unique value acquisition unit for acquiring a unique value of the medium description, and the set generating unit generates a set by associating the information about the image with the medium unique value.

With this configuration, the image reading apparatus that generates the compound image information containing the set of the information about the image and the medium unique value of the medium description is provided.

According to another aspect of the embodiment, when there are two or more media, the set generating unit of the image reading apparatus generates the set for each of the media, and generates a list of the sets, and the set unique value acquisition unit acquires a unique value from the list.

With this configuration, the image reading apparatus associates the list that contains the sets of the information about two or more images, and the images with the information about the medium description.

According to another aspect of the embodiment, the image reading apparatus includes an electronic signature generation unit for generating electronic signature information for a unique value acquired by the set unique value acquisition unit, and the image information table contains the electronic signature information.

In this way, the image reading apparatus that generates the electronic signature information for the unique value is provided.

The embodiment further provides the image information verification apparatus for verifying the compound image information generated by the image reading apparatus, which image information verification apparatus includes an image information table verification unit, and an image verification unit for verifying the image associated with the image information table.

In this way, the image information verification apparatus verifies the image information table and the image.

According to another aspect of the embodiment, the image information verification apparatus includes a communications unit for communicating with a server that stores the information about the medium description, and a medium description collation unit for collating the information about the medium description contained in the compound image information with the information about the medium description acquired from the server.

In this way, the image information verification apparatus compares the medium description stored in the server with the medium description contained in the compound image information.

The embodiment further provides the image reading method including
an image acquisition step of acquiring an image with the image reading unit that reads the image formed on the medium,
a medium description receiving step of receiving the medium description of the medium,
a set generation step of generating the set wherein the information about the image is associated with the information about the medium description, and
a set unique value acquisition step of acquiring the set unique value of the set.

According to another aspect of the embodiment, the image reading method includes a compound image information generation step of generating the compound image information wherein the image is associated with the image information table containing the set unique value, the information about the medium description, and the information about the image.

According to another aspect of the embodiment, the image reading method includes an image unique value acquisition step of acquiring an image unique value of the image, wherein the set generation step generates a set of the image unique value and the information about the medium description.

According to another aspect of the embodiment, the image reading method includes a medium unique value acquisition step of acquiring the unique value of the medium description, wherein the set generation step generates a set of the information about the image and the medium unique value.

According to another aspect of the embodiment, when there are two or more media, the set generation step of the image reading method generates a list of sets corresponding to the media, and the set unique value acquisition step acquires a unique value of the list.

According to another aspect of the embodiment, the image reading method includes an electronic signature generation step of generating electronic signature information of the unique value acquired by the set unique value acquisition step, wherein the image information table contains the electronic signature information.

The embodiment further provides the image information verification method carried out by the image information verification apparatus, which method is for verifying the compound image information generated by the image reading unit. The image verification method includes an image information table verification step of verifying the image information table, and an image verification step of verifying the image associated with the image information table.

According to another aspect of the embodiment, the image information verification method includes
a communication step of communicating with the server that stores the information about the medium description, and
a medium description collation step of collating the information about the medium description contained in the compound image information with the information about the medium description acquired from the server.

The embodiment further provides an image reading program for a computer to perform the image reading method and the image information verification method described above.

Effectiveness of Invention

According to the image reading apparatus of the present invention, an image formed on a medium is associated with a medium description of the medium.

DESCRIPTION OF THE PREFERRED EMBODIMENTS

In the following, embodiments of the present invention are described with reference to the accompanying drawings.
(Configuration of Image Reading Apparatus)

Figure 1:
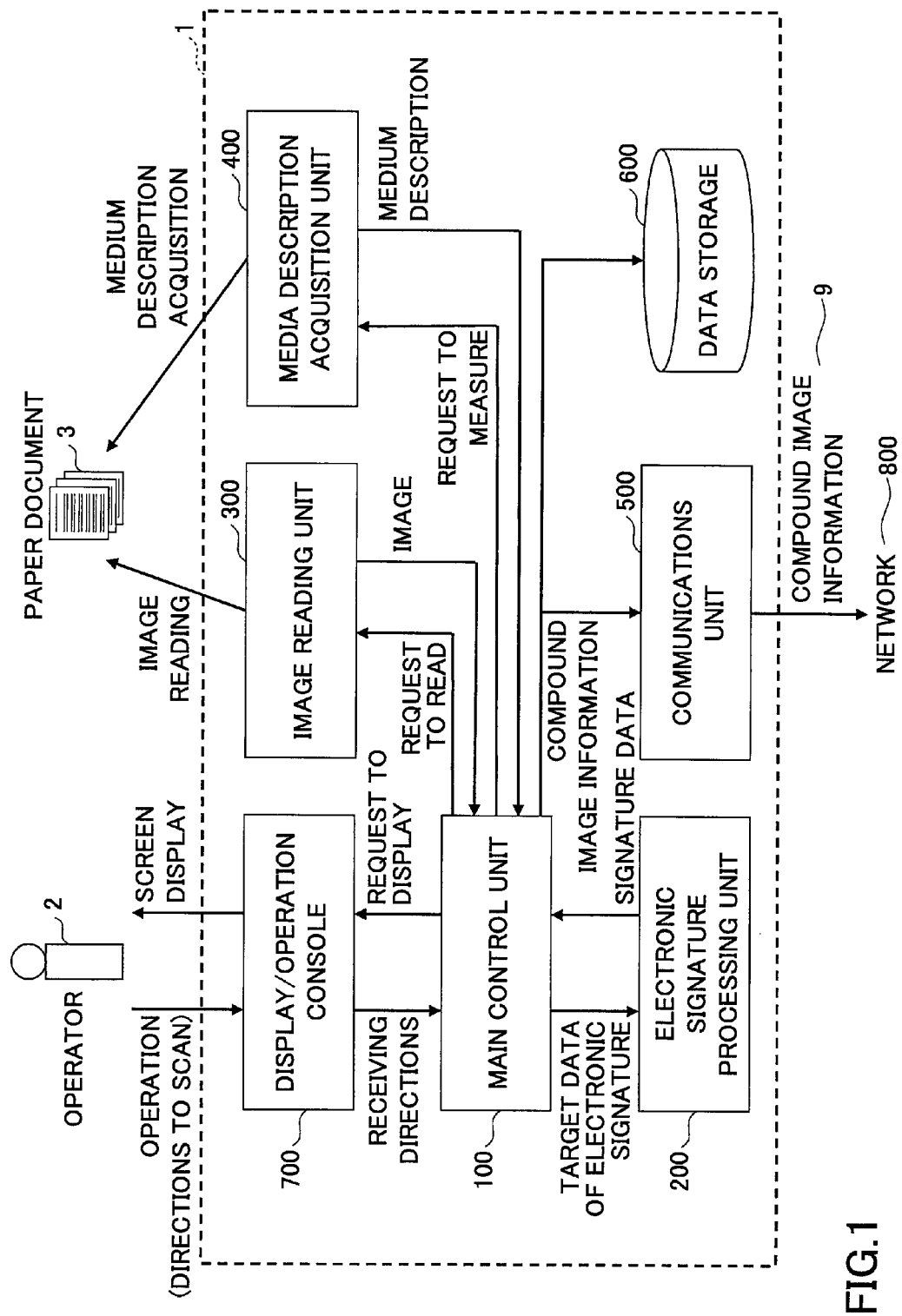
FIG. 1 is a block diagram of an image reading apparatus according to the present invention.

FIG. 1 shows the configuration of an image reading apparatus 1 according to the embodiment of the present invention. The image reading apparatus 1 generates compound image information 9 that includes an image read from a paper document 3 based on directions of an operator 2. The image reading apparatus 1 includes a main control unit 100. The image reading apparatus 1 may further include an electronic signature processing unit 200, an image reading unit 300, a medium description acquisition unit 400, a communications unit 500, a data storage 600, and a display/operation unit 700.

The main control unit 100 controls processes carried out by the image reading apparatus 1. The main control unit 100 generates a set of first information about the image read from the paper document 3 and second information about the medium description of the paper document 3, that is, the first information of the set is associated with the second information of the set. Further, the main control unit 100 generates the compound image information 9 that contains the information about the set and the image.

The electronic signature processing unit 200 generates electronic signature information for target data such as the information about the set, and the like, generated by the main control unit 100.

The image reading unit 300 is for reading an image formed on a medium such as the paper document 3. When an image reading request is provided by the main control unit 100, the image reading unit 300 reads the image and outputs the image to the main control unit 100. The image reading unit 300 is preferably a scanner; however, other devices such as a camera can serve the purpose so long that the image formed on the medium can be digitally acquired.

The medium description acquisition unit 400 is for measuring and acquiring a value of the medium description of a medium, such as paper. The medium description may be any item so long as a unique value can be obtained for identifying the medium; for example, a wave form of dispersion intensity of a laser light dispersed by twining fiber that constitutes the paper (Non Patent Reference 1), an image of a light that penetrates the twining fiber of the paper (Patent Reference 3), and an irregularity of the surface of a magnetic medium (Patent Reference 3).

The communications unit 500 is for communicating with an external apparatus such as a server that is connected either directly or through a network 800. The communications unit 500 may transmit the compound image information 9 of the image that is read by the image reading unit 300 and processed by the main control unit 100 to the external apparatus, and the like. The data storage 600 is for storing data that the image reading apparatus 1 processes. The data storage 600 may store the compound image information 9 about the image read by the image reading unit 300. When the image reading apparatus 1 is constituted as a computer, the data storage 600 may further store a program that the main control unit 100, and the like, is to execute, and may serve as a working memory when the main control unit 100, and the like, executes the program. Further, the data storage 600 may store a private key that is used by the image reading apparatus 1 when generating an electronic signature so that the private key cannot be read from the exterior of the image reading apparatus 1. The data storage 600 may hold a public key or a public key certificate corresponding to the private key.

The display/operation unit 700 is for input directions about a process that the image reading apparatus 1 performs, and displays the status of the image reading apparatus 1, and the like.
(Functional Configuration of Image Reading Apparatus)

Figure 2:
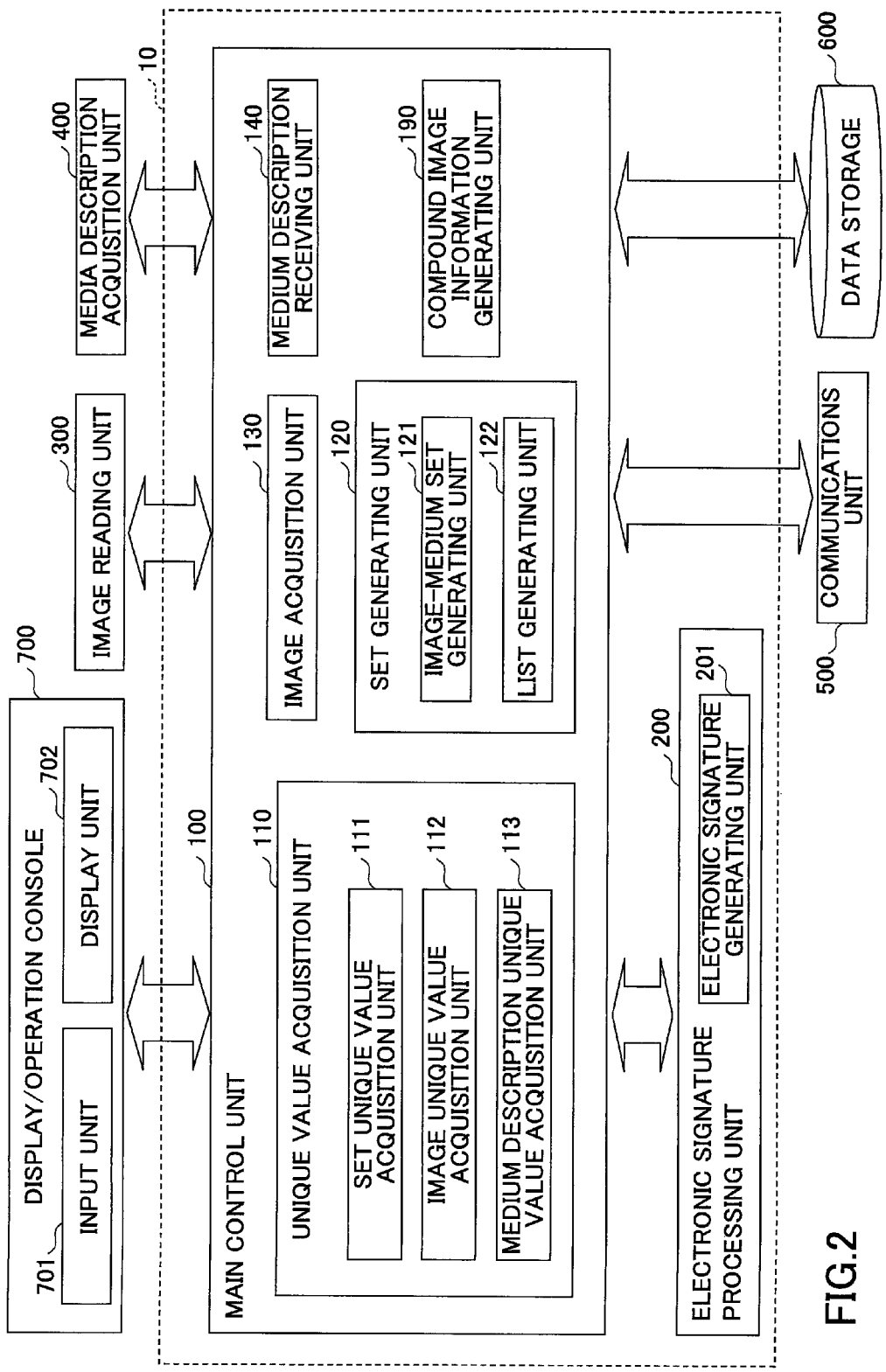
FIG. 2 is a detailed block diagram of the image reading apparatus according to the present invention.

FIG. 2 shows an example of the functional configuration of the image reading apparatus of the present invention. FIG. 2 gives details of the image reading apparatus 10 containing the main control unit 100 always included in the image reading apparatus of the present invention among the functional units that are included in the image reading apparatus 1 of FIG. 1.

The image reading apparatus 10 shown in FIG. 2 includes the main control unit 100. The image reading apparatus 10 may further include the electronic signature processing unit 200. The main control unit 100 carries out processes to realize functions of the image reading apparatus 10, and performs further control of each functional unit and apparatus that is connected to the image reading apparatus 10. The main control unit 100 includes a unique value acquisition unit 110, a set generating unit 120, an image acquisition unit 130, and a medium description receiving unit 140. The main control unit 100 may further include a compound image information generation unit 190.

The unique value acquisition unit 110 is for acquiring a characteristic value (unique value) expressing a description of, e.g., an image. Here, although the characteristic value is a value uniquely given to an object, since the amount of operations for determining that there are no overlapping values is great, (that is, since the amount of operations for acquiring a truly unique value is great), a quasi-unique value such as a hash value may be used.

The unique value acquisition unit 110 includes a set unique value acquisition unit 111. The unique value acquisition unit 110 may include an image unique value acquisition unit 112 and a medium description unique value acquisition unit 113. The set unique value acquisition unit 111 is for generating a characteristic value (unique value) of a set of the information about the image and the information about the medium description that the set generating unit 120 generates. Where the set generating unit 120 generates a list of two or more sets of the information about an image and the information about the medium description, the set unique value acquisition unit 111 generates a characteristic value of the list.

The image unique value acquisition unit 112 generates a characteristic value (unique value) of the image read by the image reading unit 300 and acquired by the image acquisition unit 130. The medium description unique value acquisition unit 113 generates a characteristic value (unique value) of the medium description acquired by the medium description acquisition unit 400 and received by the medium description receiving unit 140.

The set generating unit 120 generates a set of the image acquired by the image acquisition unit 130 and the medium description received by the medium description receiving unit 140. The set generating unit 120 may generate a set of information about the image and information about the medium description. Here, the information about the image is either the image or the characteristic value of the image, and the information about the medium description is either the medium description or the characteristic value of the medium description.

The set generating unit 120 includes an image-medium set generating unit 121 and the list generation unit 122. The image-medium set generating unit 121 is for generating a set of an image acquired by the image acquisition unit 130 and the medium description corresponding to the image. The list generation unit 122 is for generating a list that contains two or more sets of the information about the image and the information about the medium description.

The image acquisition unit 130 is for acquiring an image from the image reading unit 300, and the medium description receiving unit 140 is for receiving the medium description from the medium description acquisition unit 400.
Here, although the image reading unit 300 and the medium description acquisition unit 400 are outside of the image reading apparatus 10 according to the configuration shown in FIG. 2, the present invention is not limited to this configuration. The image reading unit 300 and the medium description acquisition unit 400 may be included in the image reading apparatus as shown in FIG. 1, then acquisition of the image on the medium and the medium description of the medium can be carried out by one apparatus, and associating the information about the image with the information about the medium description can be facilitated with improved accuracy.

The compound image information generation unit 190 is for generating compound image information 9 that includes the characteristic value acquired by the unique value acquisition unit 110 and the image acquired by the image acquisition unit 130. The compound image information 9 generated by the compound image information generation unit 190 may include electronic signature information of the characteristic value acquired by the unique value acquisition unit 110. In this way, an apparatus that acquires the compound image information 9 can detect an alteration of an image, a characteristic value, and the like, by verifying the compound image information 9 with the electronic signature.

The electronic signature processing unit 200 includes an electronic signature generation unit 201 for generating an electronic signature for the unique value provided by the unique value acquisition unit 110. When a set unique value is provided, the electronic signature generation unit 201 generates an electronic signature for the set unique value. The electronic signature generation unit 201 generates an electronic signature for the unique value of a list, when the unique value of the list containing two or more sets is provided as the set unique value.

The display/operation unit 700 includes an input unit 701 and a display unit 702. The input unit 701 is for the operator 2 to input operational directions to the image reading apparatus 10, and the display unit 702 is for displaying the status of the image reading apparatus 10 among other things. Here, the input unit 701 and the display unit 702 may be combined into one apparatus that may include a liquid-crystal touch panel. The image reading unit 300, the medium description acquisition unit 400, the communications unit 500, and the data storage 600 shown in FIG. 2 are the same as shown in FIG. 1, and their descriptions are not repeated.
(Data Flow in the Image Reading Apparatus)

Figure 3:
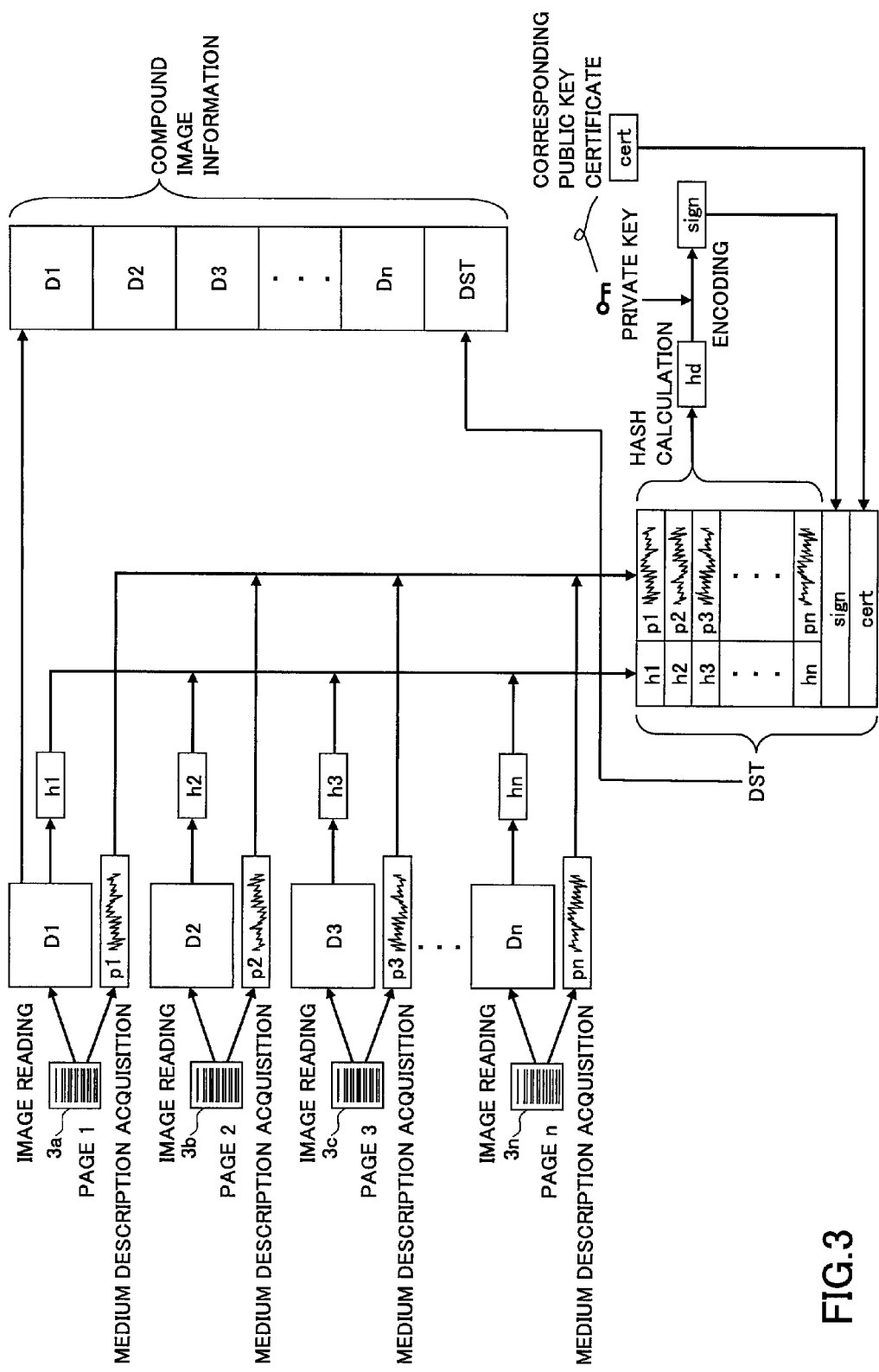
FIG. 3 is a schematic diagram showing flows of data processed by the image reading apparatus of the present invention.

FIG. 3 shows the data flow of the image reading apparatus of the present invention when the compound image information 9 is generated from an image on the medium. Here, images and medium descriptions of the paper document 3 that consists of n pages are acquired, and the compound image information 9 is generated.

With reference to FIG. 3, pages 3a through 3n of the paper document are read by the image reading unit 300, and images D1 through Dn, respectively, are acquired by the image acquisition unit 130. Next, image unique values h1 through hn are generated by the image unique value acquisition unit 112 corresponding to the imaged D1 through Dn. On the other hand, the medium description acquisition unit 400 acquires medium descriptions p1 through pn for the pages 3a through 3n, respectively, and the acquired medium descriptions are provided to the medium description receiving unit 140.

The set generating unit 120 generates a set of the unique value h of the image and the medium description p of every page, and generates a list of the sets for all the pages of the read paper document 3. The set unique value acquisition unit 111 generates a unique value hd of the list, and provides the unique value to the electronic signature processing unit 200. The electronic signature generation unit 201 generates an electronic signature ("sign" in FIG. 3) corresponding to the list and a digital signature table DST that include the list and the electronic signature. Here, the DST generated by the electronic signature generation unit 201 may contain the public key certificate ("cert" in FIG. 3).

The compound image information generation unit 190 associates the DST generated by the electronic signature generation unit 201 with the images D1 through Dn acquired by the image acquisition unit 130 and generates the compound image information 9.
(Process Flow of the Image Reading Apparatus)

Figure 4:
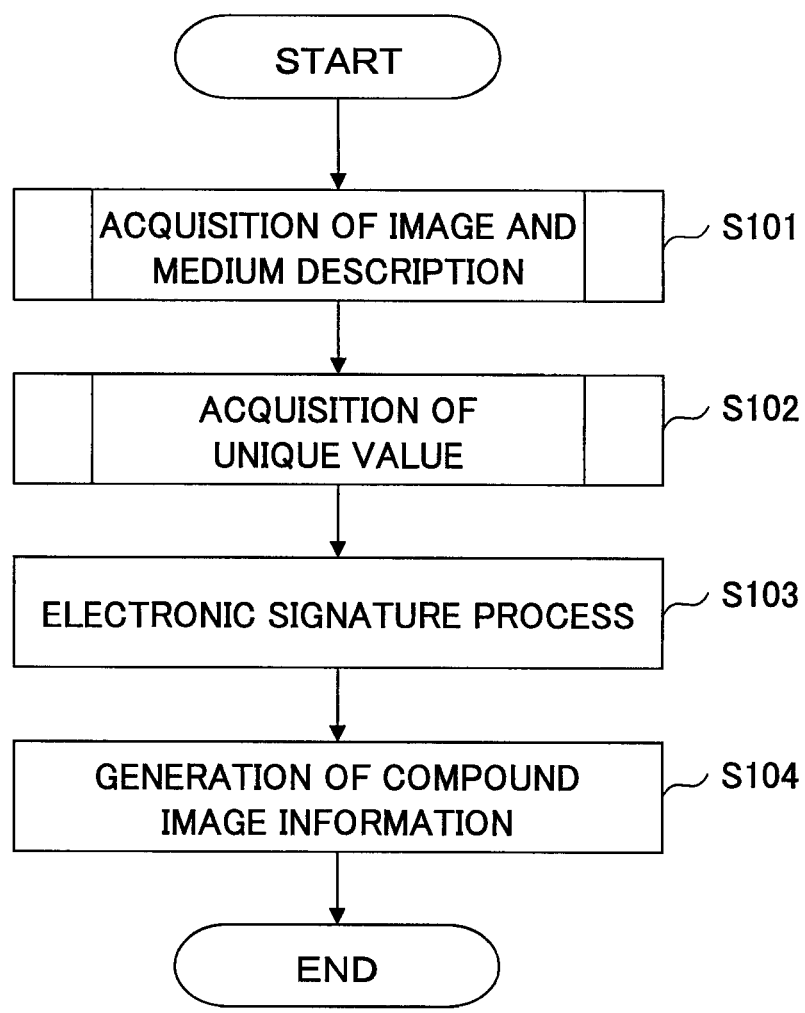
FIG. 4 is a flowchart of a process carried out by the image reading apparatus of the present invention.
Figure 5:
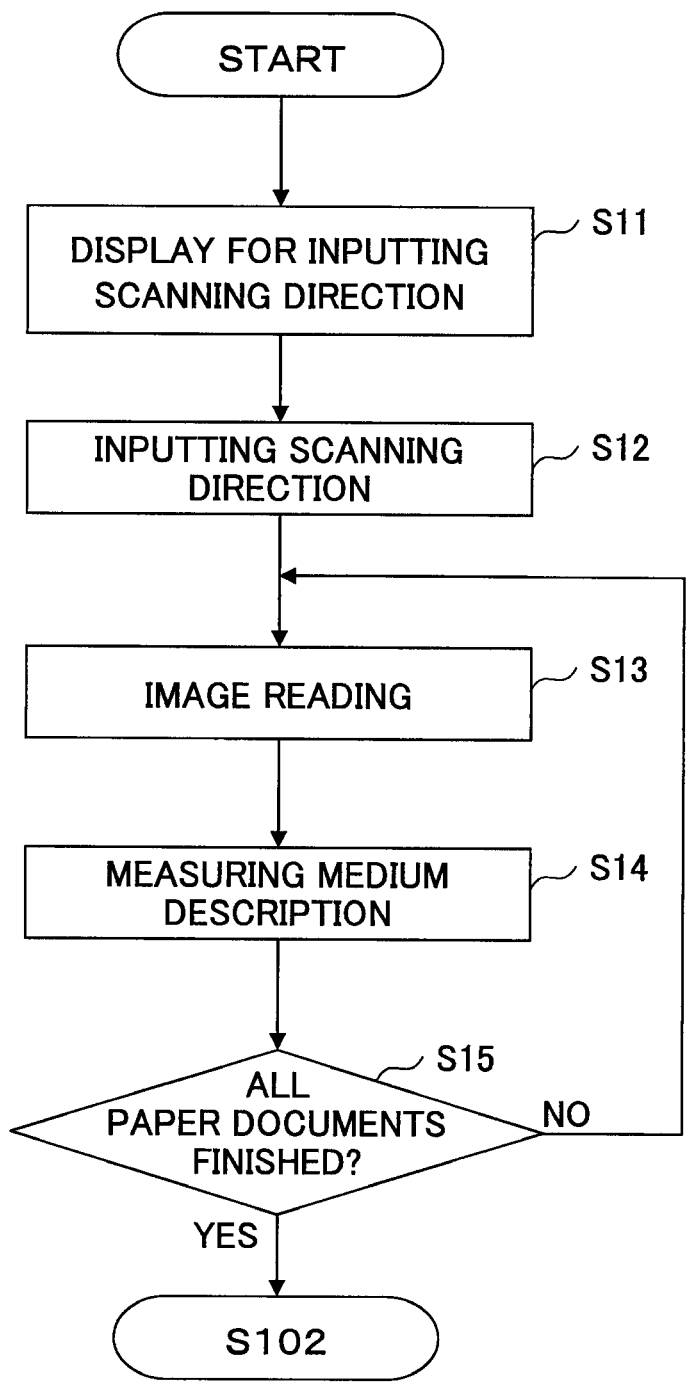
FIG. 5 is a flowchart of a process carried out by the image reading apparatus of the present invention when acquiring an image and a medium description.
Figure 6:
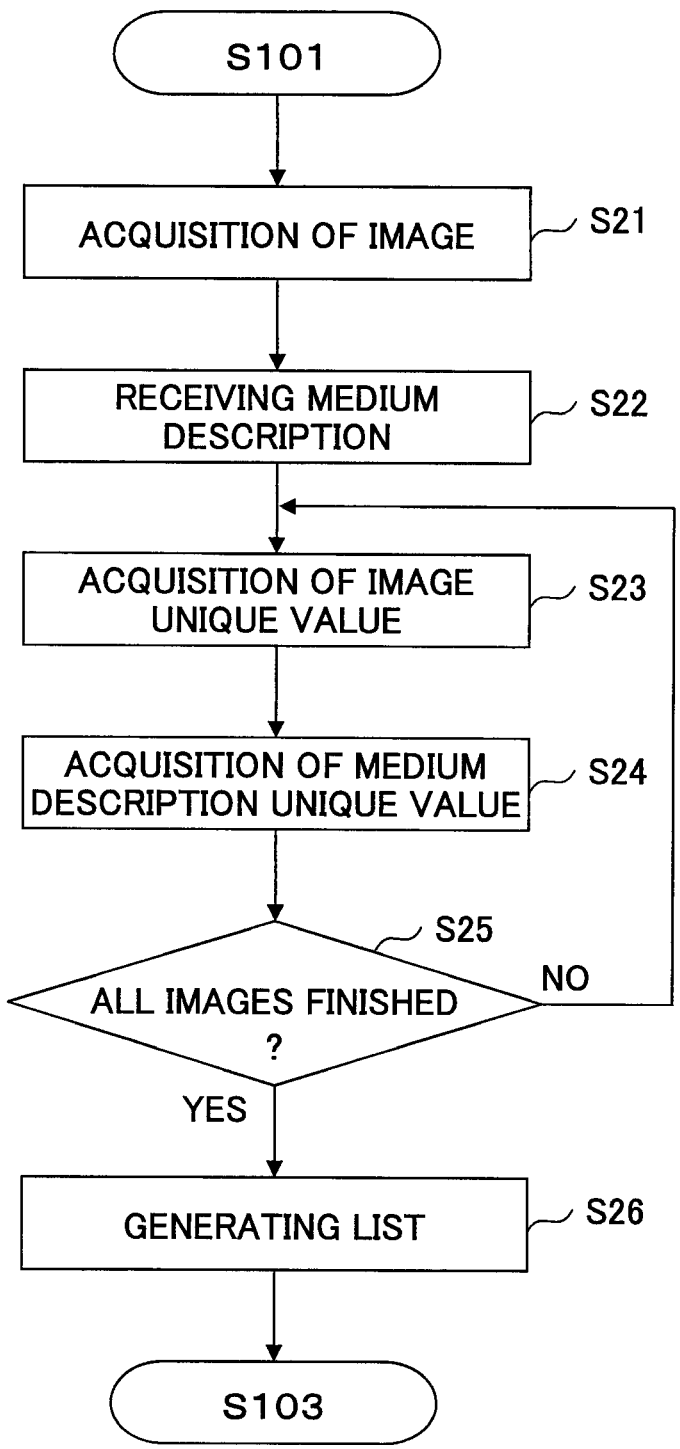
FIG. 6 is a flowchart of a process carried out when generating a set of information about an image and information about the medium description.

FIGS. 4 through 6 are flowcharts of processes that the image reading apparatus according to the embodiment of the present invention performs. FIG. 4 shows an outline of the processes. FIG. 5 shows an acquisition process of acquiring the image and the medium description. FIG. 6 shows an acquisition process of acquiring a characteristic value (unique value).

With reference to FIG. 4, at step S101, the image reading unit 300 and the medium description acquisition unit 400 acquire the image on the paper document 3 and the medium description of the paper document 3, respectively. FIG. 5 shows details of Step S101 in FIG. 4, wherein an example of a process of acquiring the image and the medium description is shown. Here, according to the embodiment, the process of step S101 is carried out by the image reading apparatus; however, the process may be carried out by an apparatus that is capable of image reading, and capable of measuring the descriptions of the medium, which apparatus is connected to the image reading apparatus.

With reference to FIG. 5, at step S11, the display unit 702 displays an input screen for inputting scanning directions. At step S12, scanning directions are provided by the input unit 701. At step S13, the image reading unit 300 reads the image D1 on the first page of the paper document 3. Here, the image reading unit 300 may read the image based on a reading request provided by the main control unit 100. At step S14, the medium description acquisition unit 400 acquires the medium description p1 of the first page of the paper document 3. Here, the medium description acquisition unit 400 may acquire the medium description based on an acquisition request provided by the main control unit 100.

At step S15, the main control unit 100 determines whether image reading and the medium description acquisition are completed for all the pages of the paper document 3 that are input into the image reading apparatus 10. If the determination is affirmative, the process proceeds to step S102. If the determination is negative, the process returns to step S13.

At step S13 and step S14 following step S15, image reading and medium description acquisition are performed about the next page of the paper document 3 processed after the page processed at the last step S13 and the last step S14.

By processing step S11 through step S15, acquisition of the image and the medium description is completed about the paper that constitutes the paper document 3.

With reference to FIG. 4, again, at step S102 following step S101, the unique value acquisition unit 110 acquires characteristic values (unique values) of the images, and the like. FIG. 6 shows details of step S102, wherein the flow of an example of a process of generating a set of information about the image and information about the medium description is illustrated.

With reference to FIG. 6, at step S21, the image acquisition unit 130 acquires the image read by the image reading unit 300. At step S22, the medium description receiving unit 140 receives the medium description acquired by the medium description acquisition unit 400. Here, step S21 and step S22 may be performed either for every medium, or for all the medium descriptions after all the images are acquired. In either case, each step S22 may be performed in parallel with its corresponding previous step S21 in a pipeline manner. At step S23, the image unique value acquisition unit 112 acquires the unique value h1 of the first page. At step S24, the medium description unique value acquisition unit 113 acquires a unique value phi of the medium description. At step S25, the main control unit 100 determines whether the processes of step S23 and step S24 are completed for all the images that are acquired at step S21. If the determination is affirmative, the process proceeds to step S26. If the determination is negative, it returns to step S23. At step S23 and step S24 following step S25, unique values of the image and the medium description of the page processed after the page processed at the last step S23 and the last step S24 are acquired.

At step S26, the image-medium set generating unit 121 generates a group of sets of information about an image and information about the medium description for every page of the paper document 3, and the list generation unit 122 generates a list of the sets corresponding to all the images acquired at step S21.

Here, in FIG. 6, although the set of the unique value of the image and the unique value of the medium description is generated, the set generated by the image reading apparatus of the present invention may be any of sets of
an image and a unique value of a medium description,
a unique value of an image and a medium description, and an image and a medium description. Where the unique value of an image is not used, the process of step S23 is not required. Similarly, where the unique value of the medium description is not used, the process of step S24 is not required.
By the process of step S21 through step S26, the unique values of the images acquired by the image unit 130, and the like, are acquired.

With reference to FIG. 4, again, at step S103, the electronic signature generation unit 200 generates the electronic signature for the set or the list generated at step S102, and generates the DST.

At step S104 following step S103, the compound image information generation unit 190 generates the compound image information 9 by associating the image acquired at step S101 with the DST generated at step S103.

(Functional Configuration of the Image Information Verification Apparatus)

Figure 7:
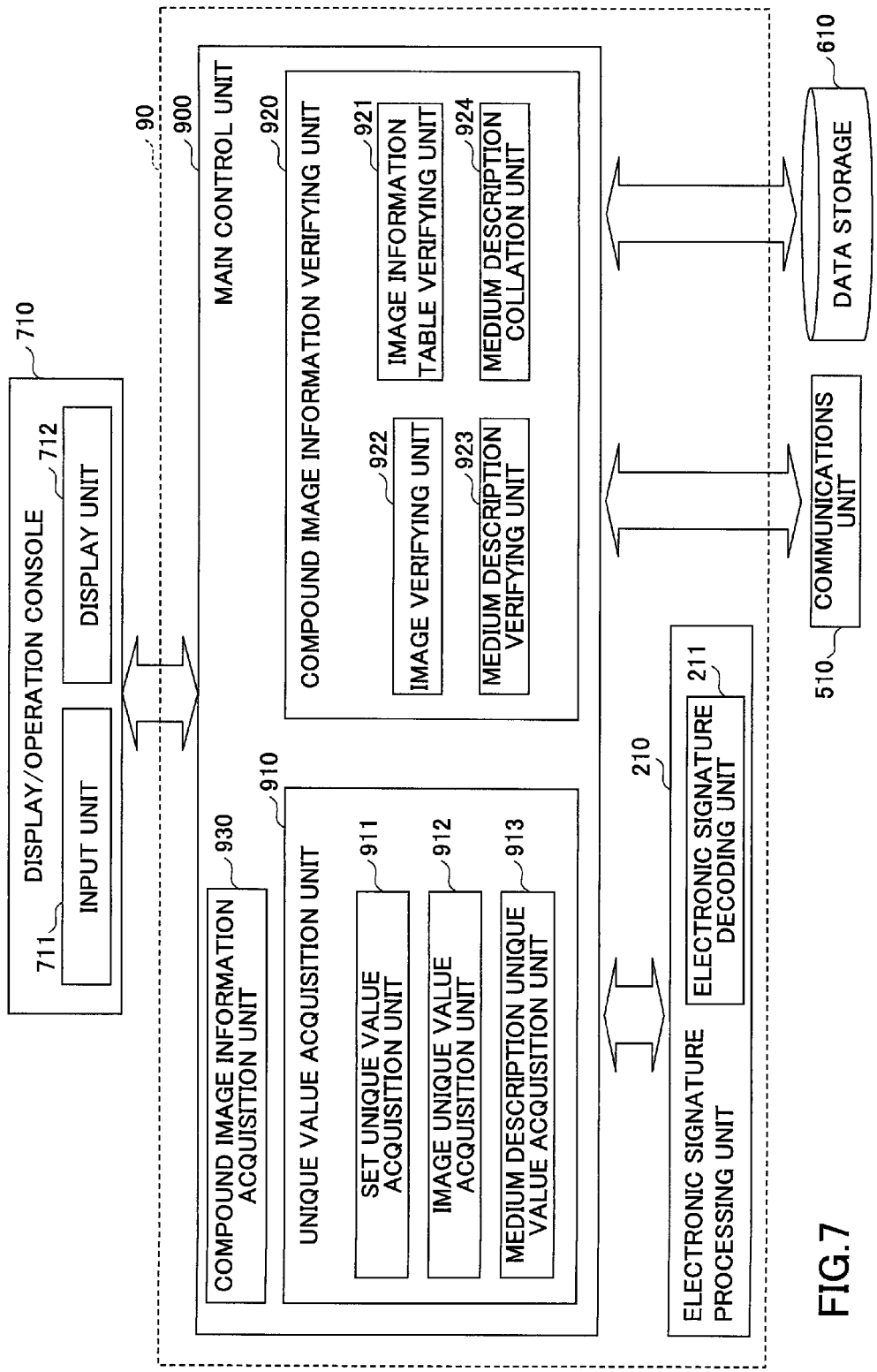
FIG. 7 is a block diagram of an image information verification apparatus according to the present invention.

FIG. 7 is a block diagram of an example of the functional configuration of an image information verification apparatus 90 according to the embodiment of the present invention. In FIG. 7, the image information verification apparatus 90 acquires the compound image information 9, compares a characteristic value, etc., and determines whether the image contained in the compound image information 9 has been tampered with.

The image information verification apparatus 90 includes a main control unit 900. The image information verification apparatus 90 may include the electronic signature processing unit 210. The image information verification apparatus 90 is connected to the display/operation unit 710, a communications unit 510, and the data storage 610 so that functions, such as inputting directions, I/O for an external apparatus, and data storing are realized.

The main control unit 900 includes a compound image information acquisition unit 930, a unique value acquisition unit 910, and a compound image information verification unit 920. The compound image information acquisition unit 930 is for acquiring the compound image information 9 (see FIG. 1) generated by the image reading apparatus of the present invention.

The unique value acquisition unit 910 is for acquiring the characteristic value (unique value) of the image or the medium description contained in the compound image information 9 that the compound image information acquisition unit 930 acquires. Note that the characteristic value is a value about the target description and is a value uniquely given to an object; however, a quasi-unique value such as a hash value may also be used, because the amount of operations for determining that there are no overlapping values is great. Then, for example, SHA-1 is used for a hash function. The unique value acquisition unit 910 includes a set unique value acquisition unit 911, an image unique value acquisition unit 912, and a medium description unique value acquisition unit 913.

The set unique value acquisition unit 911 is for generating the characteristic value of a set of an image and a medium description corresponding to the image that the compound image information 9 contains. Out of the DST contained in the compound image information 9, the set unique value acquisition unit 911 acquires a set of the image and the medium description corresponding to the image, and generates the characteristic value of the set. Further, when the compound image information 9 contains two or more images, the set unique value acquisition unit 911 acquires a list that contains two or more sets of an image and associated medium description corresponding to the image out of the DST contained in the compound image information 9, and generates a characteristic value of the list.

The image unique value acquisition unit 912 is for generating and acquiring a characteristic value for every image contained in the compound image information 9. The medium description unique value acquisition unit 913 is for generating and acquiring a characteristic value of the medium description contained in the compound image information 9.

The compound image information verification unit 920 is for determining whether tampering such as making an alteration has occurred in the image contained in the compound image information 9. The compound image information verification unit 920 determines the occurrence of tampering by comparing the unique value that the unique value acquisition unit 910 acquires with the unique value contained in the compound image information 9. The compound image information verification unit 920 includes an image information table verification unit 921, an image verification unit 922, a medium description verification unit 923, and a medium description collation unit 924.

The image information table verification unit 921 compares the unique value of the list or the set acquired by the set unique value acquisition unit 911 with the unique value of the list or the set contained in the compound image information 9. When both are in agreement, it is determined that no tampering has occurred in the list or the set.

The image verification unit 922 compares the unique value of the image acquired by the image unique value acquisition unit 912 with the unique value of the image contained in the compound image information 9. When both are in agreement, it is determined that no tampering has been performed on the image.

The medium description verification unit 923 compares the unique value of the medium description acquired by the medium description unique value acquisition unit 913 with the unique value of the medium description contained in the compound image information 9. When both are in agreement, it is determined that the medium description has not been tampered with.

The medium description collation unit 924 determines whether a medium description that is in agreement with the medium description contained in the compound image information 9 is contained in a medium description database that is not illustrated. In this way, it is determined whether a medium having the medium description is already stored in the database. In addition, whether tampering has occurred is determined by the compound image information verification unit 920 depending on the agreement of the unique value acquired by the unique value acquisition unit 910 and the unique value contained in the compound image information 9. The "agreement" may not be limited to a complete "agreement"; but may include an "agreement" to a predetermined degree.

The electronic signature processing unit 210 includes an electronic signature decoding unit 211 for decoding the electronic signature information contained in the compound image information 9. The electronic signature decoding unit 211 decodes the electronic signature information contained in the compound image information 9 with a public key corresponding to the electronic signature information. Here, the public key may be either beforehand contained in the compound image information 9, or acquired from a predetermined server by the communications unit, etc.

The image information verification apparatus 90 is connected to the communications unit 510 that communicates with an apparatus such as a server that is either directly connected or connected through a network. The image information verification apparatus 90 is connected to a data storage 610 for storing the compound image information 9, and the like. The data storage 610 may store a program for the image information verification apparatus 90 to execute when the image information verification apparatus 90 is constituted as a computer. The data storage 610 may be used as working memory when the image information verification apparatus 90 executes the program. The image information verification apparatus 90 is connected to a display/operation unit 710 for inputting directions and displaying the status of the image information verification apparatus 90. The display/operation unit 710 includes an input unit 711 and a display unit 712. The input unit 711 is for providing directions for executing a process in the image information verification apparatus 90, and the display unit 712 is for displaying the status of the image information verification apparatus 90. Here, the input unit 711 and the display unit 712 may be constituted as one apparatus having a liquid-crystal touch panel.

(Data Flow of the Image Information Verification Apparatus)

Figure 8:
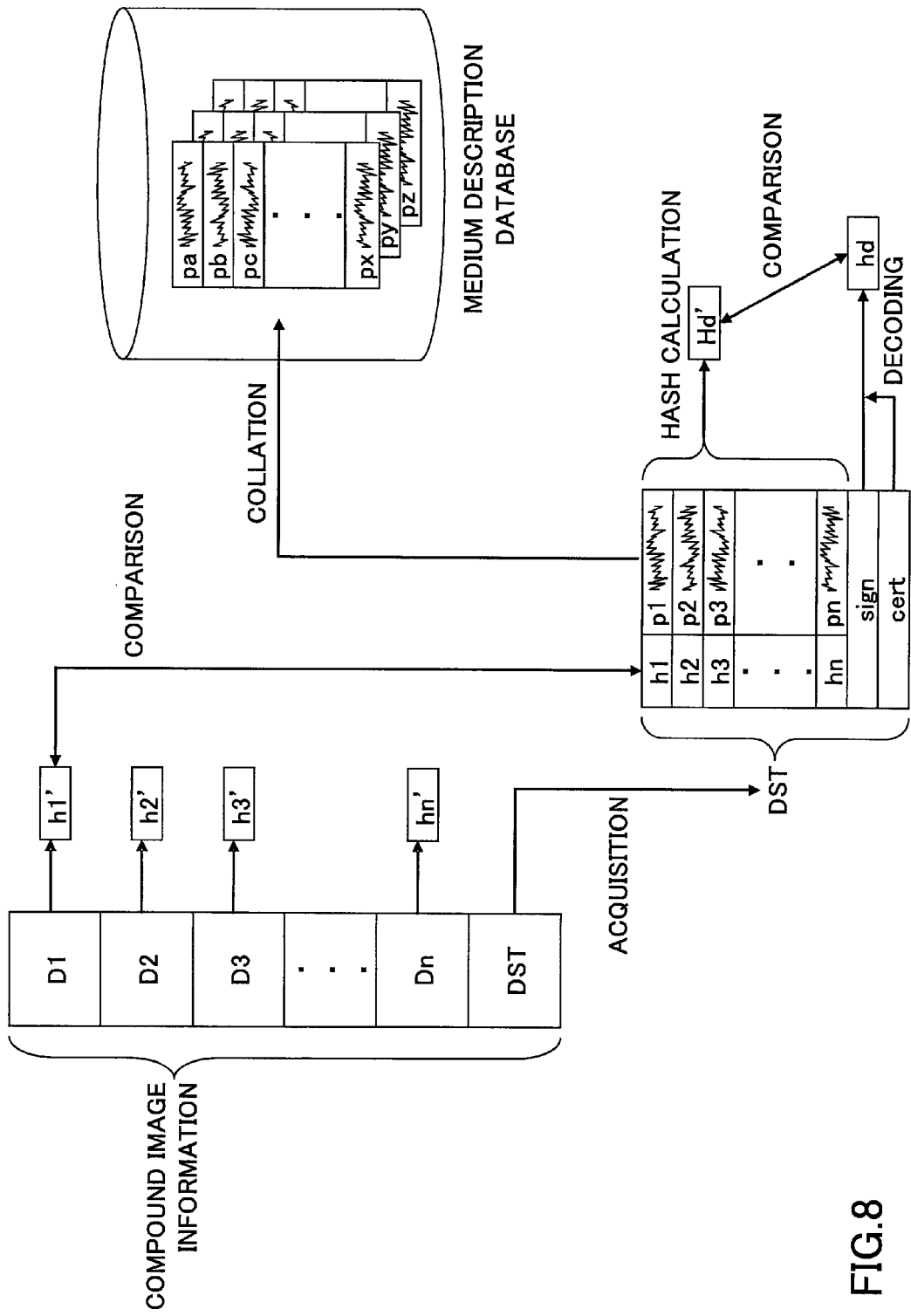
FIG. 8 is a schematic diagram showing flows of data processed by the image verification apparatus of the present invention.

FIG. 8 shows an example of the data flow when acquiring data, such as an image, from the compound image information 9 and verifying according to the embodiment of the image information verification apparatus of the present invention. According to the example, the compound image information 9 contains images of the paper document 3 that consists of n pages.

As shown in FIG. 8, the compound image information 9 contains images D1 through Dn and the DST of the paper document 3. The image unique value acquisition unit 912 generates unique values h1' through hn' corresponding to the images D1 through Dn, respectively. On the other hand, the compound image information verification unit 920 acquires the DST from the compound image information 9, and further acquires the unique values h1 through hn from the images contained in the DST. The image verification unit 922 compares the unique values h1' through hn' generated by the image unique value acquisition unit 912 with the corresponding unique values of the images acquired from the DST to determine if they agree. When they agree, it is determined that no tampering has occurred. Since the unique values are compared for every image, when only some images are tampered with out of the images, the tampered-with images can be identified.

Next, the set unique value acquisition unit 911 generates and acquires a unique value Hd' of a list containing the set of the unique values of the images and the medium descriptions that are included in the DST. On the other hand, the electronic signature decoding unit 211 decodes the electronic signature ("sign" in FIG. 8) of the unique value of the list included in the DST, and acquires a unique value hd.

The image information table verification unit 921 compares the unique value Hd' of the list that the set unique value acquisition unit 911 acquires with the unique value hd of the list decoded by the electronic signature decoding unit 211. When they (Hd' and hd) agree, it is determined that the unique values of the medium description and the image have not been tampered with.

The medium description collation unit 924 compares the medium description included in the DST with the medium description stored in a medium description database, such as a server. By the processes described above, the image information verification apparatus according to the embodiment of the present invention can detect unauthorized multiple uses and unauthorized duplication of a document in two or more media.

Although the compound image information 9 according to the example illustrated in FIG. 8 includes the medium description, the image information verification apparatus of the present invention may be configured such that the compound image information 9 contains the unique value of the medium description.

In this case, whether tampering with the medium description has occurred is detected with the medium description unique value acquisition unit 913 and the medium description collation unit 924.

Further, the medium description database may be included in any of the image reading apparatus of the present invention, the image information verification apparatus of the present invention, and other servers so long that the image information verification apparatus of the present invention is able to acquire the medium description from the medium description database.

Further, although the medium description collation unit 924 is included in the image information verification apparatus according to the embodiment of the present invention, the medium description collation unit 924 may be included in a server that has the medium description database. In this case, the image information verification apparatus transmits acquired medium information to the server, and the server determines whether a medium description that agrees with the medium description received is stored in the medium information database, and transmits a result to the image information verification apparatus.

(Process Flow of the Image Information Verification Apparatus)

Figure 9:
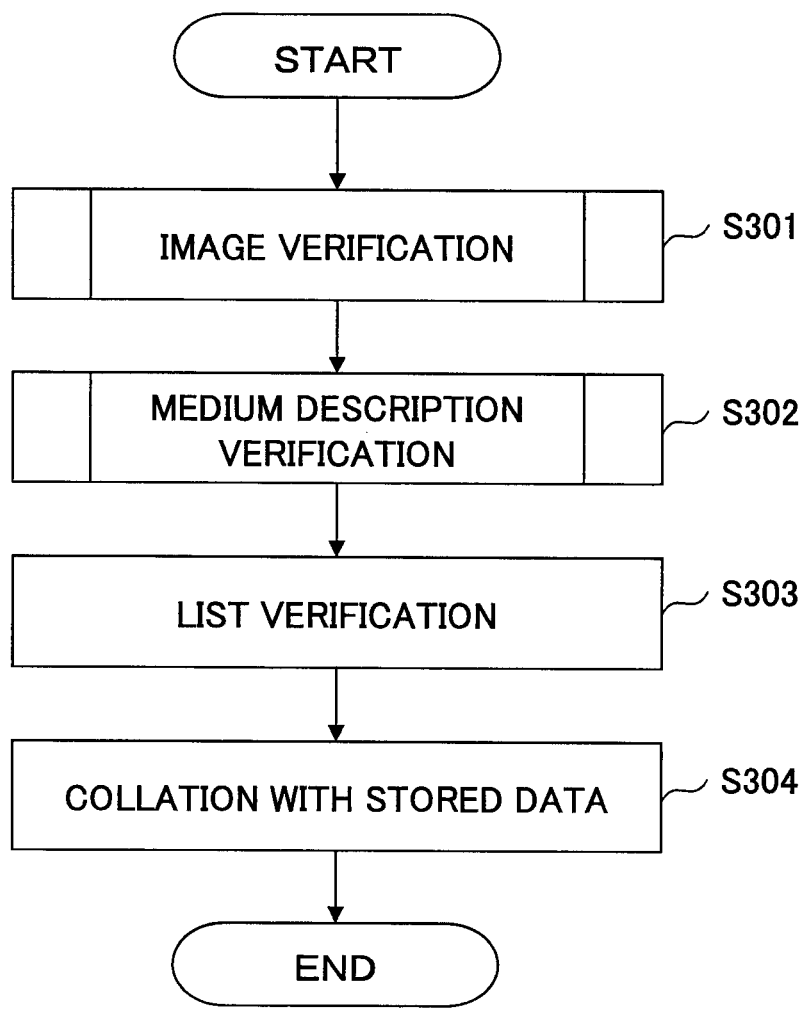
FIG. 9 is a flowchart of a process carried out by the image information verification apparatus of the present invention.
Figure 10:
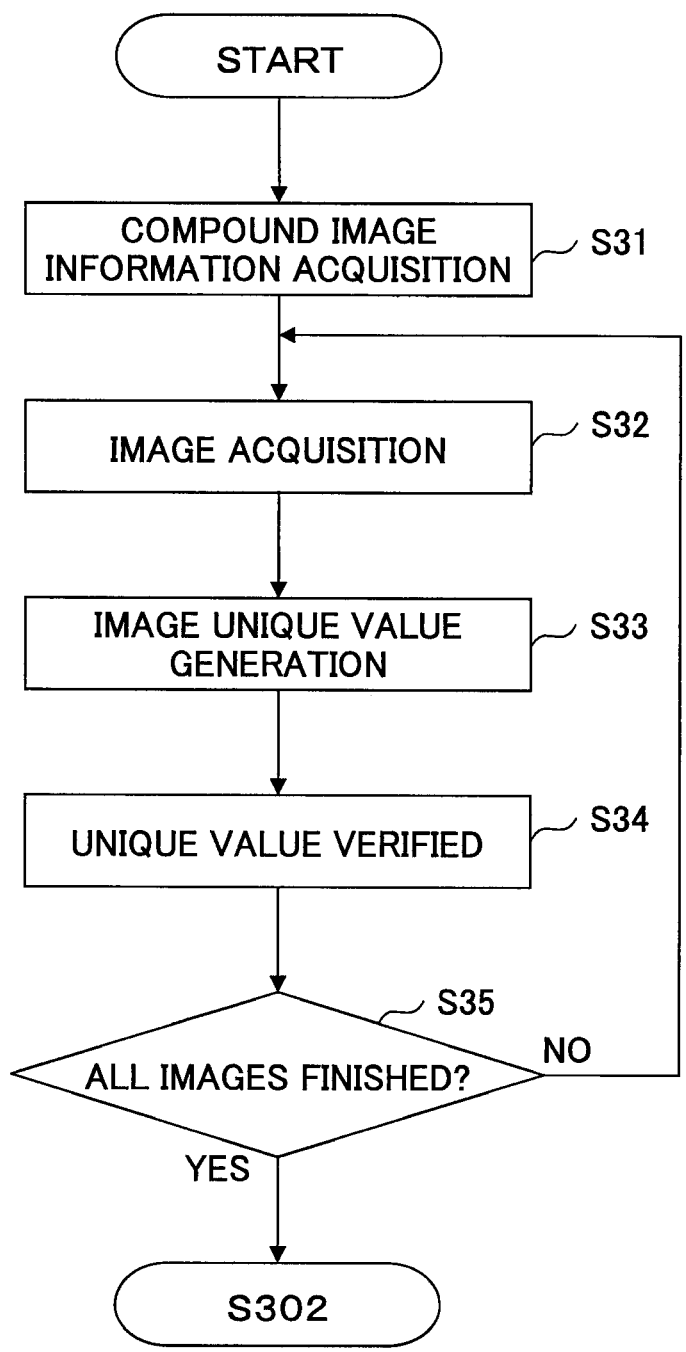
FIG. 10 is a flowchart of a process carried out by the image information verification apparatus of the present invention when verifying the information about the image.
Figure 11:
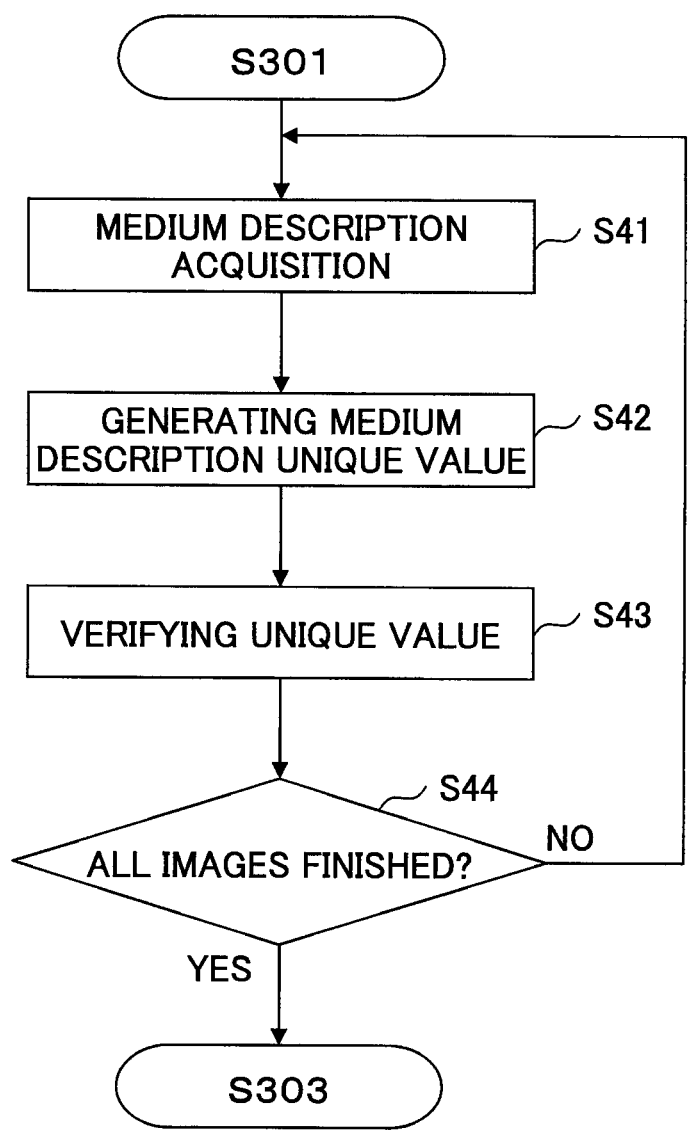
FIG. 11 is a flowchart of a process carried out by the image information verification apparatus of the present invention when verifying the information about the medium description.

Process flow the image information verification apparatus according to the embodiment of the present invention is described with reference to FIGS. 9 through 11. FIG. 9 shows the outline of the flow. FIG. 10 shows the flow of image verification. FIG. 11 shows the flow of medium description verification.

With reference to FIG. 9, at step S301, the image verification unit 922 verifies an image contained in the compound image information 9. Details of step S301 are described with reference to FIG. 10. At step S31, the compound image information acquisition unit 930 acquires the compound image information 9. The compound image information 9 may be acquired, for example, by reading data stored in the data storage 610 of the image information verification apparatus 90, by receiving it from an external apparatus through the communications unit 510, and by reading a medium containing the compound image information 9 with a medium drive that is not illustrated.

At step S32, the image unique value acquisition unit 912 acquires an image from the compound image information 9. When the compound image information 9 includes two or more images, the pages are processed for every page. At step S33, the image unique value acquisition unit 912 generates and acquires the unique value of the image acquired at step S32.

At step S34, the image verification unit 922 acquires the unique value of the image from the compound image information 9, and compares it with the unique value of the image acquired at step S33. When the two unique values are in agreement, it is determined that the image has not been tampered with.

At step S35, the main control unit 900 determines whether verification of the unique value is completed for all the images contained in the compound image information 9. If the determination is affirmative, the process proceeds to step S302. Otherwise, the process returns to step S32 so that the next image is verified.

With the above, the process of determining whether tampering has occurred in the images contained in the compound image information 9 is completed.

With reference to FIG. 9, again, at step S302 following step S301, it is determined whether tampering has occurred in the medium description contained in the compound image information 9. Here, the process of step S302 is performed when the compound image information 9 contains the unique value of the medium description. Details of step S302 are described with reference to FIG. 11.

At step S41, the medium description unique value acquisition unit 913 acquires the medium description contained in the compound image information 9. In addition, when the compound image information 9 includes two or more images, processes of step S41 through step S43 are performed for a medium description corresponding to each of the images. At step S42, the medium description unique value acquisition unit 913 generates and acquires the unique value of the medium description that is acquired at step S41. At step S43, the medium description verification unit 923 compares the unique value of the medium description acquired at step S41 with the unique value of the medium description contained in the compound image information 9. If the two unique values match, it is determined that no tampering has occurred in the medium description.

At step S44, the main control unit 900 determines whether verification of the unique value is completed for the medium description of all the images contained in the compound image information 9. If the determination is affirmative, the process proceeds to step S303. Otherwise, the process is returned to step S41 so that the verification of the medium description of the next image is performed.

With the above, the process of determining whether tampering has occurred in the medium description contained in the compound image information 9 is completed.

With reference to FIG. 9, again, at step S303 following step S302, the set unique value acquisition unit 911 generates and acquires a unique value of either the list or the set contained in the DST. On the other hand, the electronic signature decoding unit 211 decodes the electronic signature ("sign") of the unique value of the list, or the set, as applicable, contained in the DST, and acquires the unique value. The image information table verification unit 921 compares the unique value generated by the set unique value acquisition unit 911 with the unique value decoded by the electronic signature decoding unit 211. If the two unique values agree, it is determined that no tampering has occurred in the list or the set, as applicable.

At step S304 following step S303, the medium description collation unit 924 compares the medium description stored in the medium description database that is not illustrated with the medium description contained in the compound image information 9 in order to determine whether the medium description contained in the compound image information 9 is already stored in the medium description database.

With the above, whether tampering has occurred in the image and the medium description that are contained in the compound image information 9 is determined, and whether the medium that has the medium description is already stored in the medium description database is determined.

(Installation of a Public Key)

Figure 12:
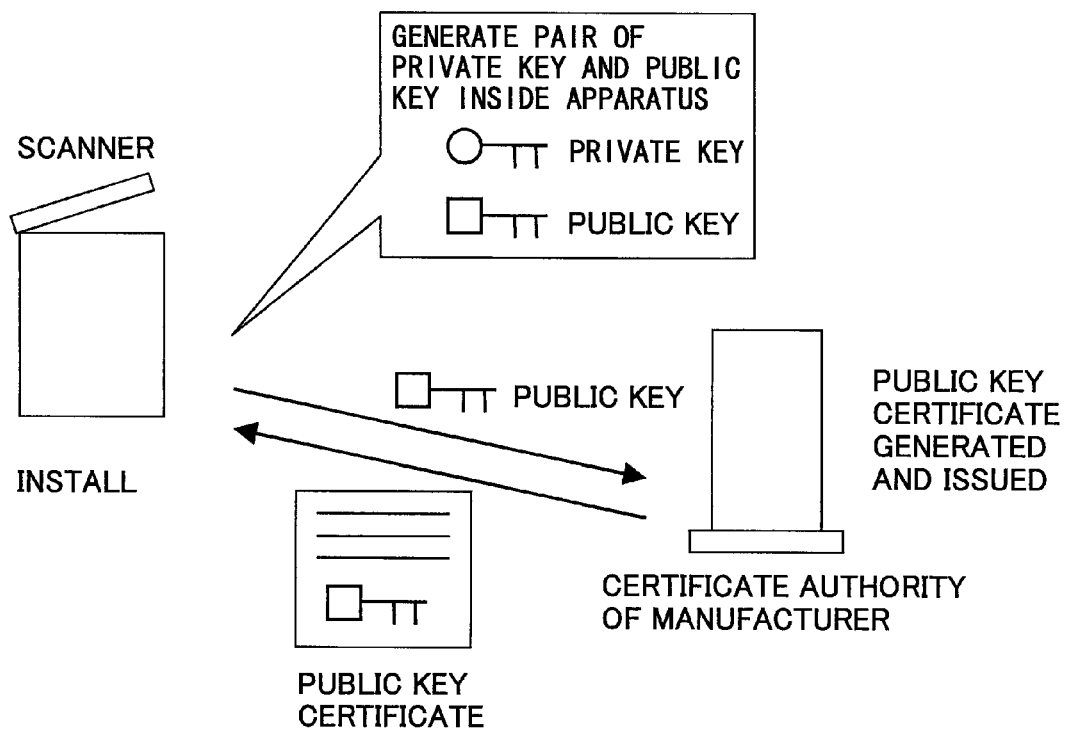
FIG. 12 is a schematic diagram showing a process storing a public key in the image reading apparatus.

FIG. 12 is a schematic drawing for explaining a process of storing a public key carried out by the image reading apparatus, when the image reading apparatus and the image information verification apparatus according to the embodiment of the present invention process the compound image information 9 using an electronic signature with a public key code. A scanner is used for an example of the image reading apparatus in FIG. 12.

When the scanner is manufactured, a pair of a private key and a corresponding public key is generated, and the private key is stored in the scanner. The private key is stored in a memory unit, and accessing the memory unit from the outside is limited among memory units of the scanner. On the other hand, as for the public key, a certificate (cert) of the public key is published by a certificate authority of the manufacturer of the scanner, and is stored in the scanner.

The certificate of the public key is contained in the DST when the compound image information generation unit 190 generates the DST. In this way, the electronic signature may be decoded with the corresponding public key.

Although the public key code is used with the electronic signature according to the embodiment, the image reading apparatus of the present invention may use other means and methods that realize the function of the electronic signature.

Further, the present invention is not limited to these embodiments, but variations and modifications may be made without departing from the scope of the present invention.

The present application is based on Japanese Priority Application No. 2006-217285 filed on Aug. 9, 2006 with the Japanese Patent Office, the entire contents of that are hereby incorporated by reference.

What is claimed is:

1. An image reading apparatus, comprising:
    an image acquisition unit configured to acquire an image from an image reading unit for reading the image formed on paper as a medium,
    a medium description receiving unit configured to receive a medium description of the paper, the medium description being a unique value, identifying the paper, generated based on features constituting the paper;
    an image unique value acquisition unit configured to generate an image unique value of the image;
    a set generating unit configured to generate a set of the image or the image unique value uniquely identifying the image and information about the medium description;
    a set unique value acquisition unit configured to generate a unique value of the set generated by the set generating unit;
    a compound image information generation unit configured to generate compound image information that includes the unique value of the set, the information about the medium description, the image unique value and the image; and
    an electronic signature generation unit configured to generate electronic signature information of the unique value of the set,
    wherein an image information table is associated with the image, and the image information table includes the unique value of the set, the information about the medium description, the image unique value, and the electronic signature information.

2. The image reading apparatus as claimed in claim 1, further comprising:
    a medium unique value acquisition unit configured to generate a unique value of the medium description;
    wherein the set generating unit is configured to generate a set of the image unique value and medium unique value.

3. The image reading apparatus as claimed in claim 1, wherein
    the set generating unit is configured to generate a list of sets for every medium where a plurality of media is handled, and
    the set unique value acquisition unit is configured to generate a unique value of the list.

4. An image information verification apparatus for verifying the compound image information generated by the image reading apparatus as claimed in claim 1, the image information verification apparatus comprising:
    an image information table verification unit configured to verify values associated with the compound image information stored in the image information table; and
    an image verification unit configured to verify the image associated with the image information table.

5. The image information verification apparatus as claimed in claim 4, further comprising:
    a communication unit configured to communicate with a server that stores the information about the medium description; and
    a medium description collation unit configured to collate the information about the medium description that the compound image information contains with the information about the medium description acquired from the server.

6. The image reading apparatus as claimed in claim 1, further comprising:
    a medium description obtaining unit configured to measure a physical feature amount of the paper as the medium description; and
    a digital signature processing unit configured to generate a digital signature of the unique value of the set generated by the set generating unit, the digital signature being generated using the physical feature amount, and the digital signature processing unit is configured to generate a digital signature table including the digital signature and the unique value of the set generated by the set generating unit.

7. The image reading apparatus as claimed in claim 6, wherein the physical feature amount is one of a waveform of dispersion intensity of a laser light dispersed by twining fiber that constitutes the paper and an image of a light that penetrates the twining fiber of the paper.

8. An image reading method, comprising:
    an image acquisition step of acquiring an image from an image reading unit for reading the image formed on paper as a medium;
    a medium description receiving step of receiving a medium description of the paper, the medium description being a unique value identifying the paper, generated based on features constituting the paper;
    an image unique value acquisition step of generating an image unique value of the image;
    a set generation step of generating a set of the image or the image unique value uniquely identifying the image and information about the medium description;
    a set unique value acquisition step of generating a unique value of the set;
    a compound image information generation step of generating compound image information that includes the unique value of the set, the information about the medium description, the image unique value and the image; and
    an electronic signature generation step of generating electronic signature information of the unique value of the set,
    wherein an image information table is associated with the image, and the image information table includes the unique value of the set, the information about the medium description, the image unique value, and the electronic signature information.

9. The image reading method as claimed in claim 8, further comprising:
    a medium unique value acquisition step of acquiring a unique value of the medium description,
    wherein the set generation step generates a set of the image unique value and the medium unique value.

10. The image reading method as claimed in claim 8, wherein
    the set generation step generates a list of sets for every medium where a plurality of media is processed, and
    the set unique value acquisition step generates a unique value of the list.

11. An image information verification method of verifying the compound image information generated at the compound image information generation step as claimed in claim 8, the image information verification method comprising:
    an image information table verification step of verifying the image information table; and
    an image verification step of verifying the image associated with the image information table.

12. The image information verification method as claimed in claim 11, further comprising:
a communication step of performing communications with a server that holds the information about the medium description; and
a medium description collation step of performing collation of the information about the medium description that the compound image information includes with the information about the medium description acquired from the server.

13. The image reading method as claimed in claim 8, further comprising:
a medium description obtaining step of measuring a physical feature amount of the paper as the medium description; and
a digital signature processing step of generating a digital signature of the unique value of the set, the digital signature being generated using the physical feature amount, and generating a digital signature table including the digital signature and the unique value of the set.

14. The image reading method as claimed in claim 13, wherein the physical feature amount is one of a waveform of dispersion intensity of a laser light dispersed by twining fiber that constitutes the paper and an image of a light that penetrates the twining fiber of the paper.

15. A non-transitory computer readable medium on which a computer-executable image reading program is stored, such that when the image reading program is executed by a computer the image reading program causes the computer to carry out the image reading method as claimed in claim 8.

* * * * *